US011946449B2

(12) United States Patent
Wisniewski

(10) Patent No.: US 11,946,449 B2
(45) Date of Patent: Apr. 2, 2024

(54) FLOW TURBINE ROTOR WITH TWISTED BLADES

(71) Applicant: Jan Wisniewski, Warsaw (PL)

(72) Inventor: Jan Wisniewski, Warsaw (PL)

(*) Notice: Subject to any disclaimer, the term of this patent is extended or adjusted under 35 U.S.C. 154(b) by 57 days.

(21) Appl. No.: 17/619,270

(22) PCT Filed: Jun. 15, 2020

(86) PCT No.: PCT/PL2020/000054
§ 371 (c)(1),
(2) Date: Dec. 15, 2021

(87) PCT Pub. No.: WO2020/256572
PCT Pub. Date: Dec. 24, 2020

(65) Prior Publication Data
US 2022/0307466 A1 Sep. 29, 2022

(30) Foreign Application Priority Data

Jun. 15, 2019 (PL) .......................... 430249

(51) Int. Cl.
*F03D 3/00* (2006.01)
*F03D 3/06* (2006.01)

(52) U.S. Cl.
CPC ............. *F03D 3/005* (2013.01); *F03D 3/062* (2013.01); *F05B 2240/211* (2013.01); *F05B 2250/25* (2013.01)

(58) Field of Classification Search
CPC ........ F03D 3/005; F05B 2240/211–217; F05B 2250/25
See application file for complete search history.

(56) References Cited

U.S. PATENT DOCUMENTS

| | | | | |
|---|---|---|---|---|
| 9,169,828 B2* | 10/2015 | Mangano | ................ | F03D 3/064 |
| 9,243,611 B2* | 1/2016 | Song | ....................... | F03D 3/061 |
| 9,267,490 B1* | 2/2016 | Paquette | ................. | F03D 3/005 |
| 2011/0280708 A1* | 11/2011 | Cochrane | ................ | F03D 3/065 |
| | | | | 415/4.4 |
| 2013/0183164 A1* | 7/2013 | Silvert | .................... | F03D 3/064 |
| | | | | 416/244 R |
| 2022/0307466 A1* | 9/2022 | Wisniewski | ............ | F03D 3/005 |

* cited by examiner

*Primary Examiner* — Christopher R Legendre
(74) *Attorney, Agent, or Firm* — Jose Cherson Weissbrot

(57) ABSTRACT

A flow turbine rotor whose operation is based on aerodynamic profiles with leading and trailing edges clearly defined by their construction, adapted for nominal operation at specific speed blade speed greater than 1.5 of the incoming wind speed, characterized in that the angle angle α, measured as a shift in the blade rotation axis (1) between the angular position of the blade trailing edge, from ¼ to ½ of the rotor height is at least 20 percent smaller than the angle β, measured as a shift in the blade rotation axis (1) between the angular position of the trailing edge of the blade, from ½ to ¾ of the height of the rotor.

7 Claims, 4 Drawing Sheets

FLOW TURBINE ROTOR WITH TWISTED BLADES

The present invention relates to a flow turbine rotor equipped with aerodynamic profiles with defined leading and trailing edges, with twisted blades, in particular as a rotor of a wind turbine with a vertical axis of rotation of the main shaft.

Known rotors of this type usually have one or more sets of blades located on the vertical main shaft of the turbine that are uniformly twisted along the rotor height.

A single-level wind turbine, known from the patent No. US 20120201687 A1: "Vertical axis wind turbine blade and its wind rotor", characterized by the fact that the cross-sections of its blades are aerodynamic profiles and the blades are twisted in such a way that between the upper and lower ends of each blade there is an angular deviation relative to the axis of rotation.

A wind turbine known from the U.S. Pat. No. 8,393,853B2 "High efficiency turbine and method for generating power" characterized by the fact that the cross-sections of its wings are aerodynamic profiles with a non-zero angle of attack, and the blades have a spiral wound trajectory relative to the axis of rotation.

The system known from the U.S. Pat. No. 6,036,443A: "Helical turbine assembly operable under multidirectional gas and water flow for power and propulsion systems" consists of a multitude of rotor modules mounted on a rotatable shaft with blades twisted longitudinally along the height of the rotor shaft.

A "Vertical axis wind turbine having modular blades with support arm at joint", known from the patent GB2484109A, is equipped with modular blades twisted symmetrically relative to the centre of the rotor blades.

Among the known flow turbine rotors equipped with aerodynamic profiles with defined leading and trailing edges, operating nominally at rotor speeds greater than the speed of the inflowing fluid stream, i.e. gas or liquid, there are solutions with evenly twisted rotor blades along the rotating shaft, as well as a solution with a simplified design, where blades are twisted symmetrically relative to the centre of the rotor blades.

The solution according to the invention is in the form of a flow turbine rotor operating on the basis of aerodynamic profiles with clearly defined leading and trailing edges, adapted for nominal operation at specific speed blade speed greater than 1.5 of the incoming wind speed, characterized in that the angle $\alpha$, measured as a shift in the axis or rotation of the blades between the angular position of the blade trailing edge, at a height along the shaft on ¼ of its length, measured parallel to the rotor shaft—the blades from the shaft mounting side, and the angular position of the blade trailing edge, at a height along the shaft on ½ of its length, measured parallel to the rotor shaft—the blades, is at least 20 percent smaller and preferably at least 30 percent smaller than the angle $\beta$, measured as the shift in the axis of rotation of the blades between the angular position of the blade trailing edge, at a height corresponding to ½ of their length, measured parallel to the rotor shaft—the blades and the angular position of the trailing edge of the blades, at a height corresponding to ¾ of their length, measured parallel to the rotor shaft—the blades. Additional benefits are obtained when the longitudinal twist angle of the blades in the rotor axis along the entire height of the rotor is not less than 90% of the full angle divided by the number of blades in the rotor, preferably not less than 100% of the full angle divided by the number of blades in the rotor. Particular benefits can be obtained when the longitudinal twist angle of the blades in the rotor axis along the entire height of the rotor is between 100% and 120% of the full angle divided by the number of blades in the rotor. Additional benefits are possible in the variant in which the longitudinal twist angle of the blades in the rotation axis of the rotor along the entire height of the rotor is not less than 90% of the half-full angle divided by the number of blades in the rotor. Additional benefits are achieved when the longitudinal twist angle of the blades in the rotation axis of the rotor along the entire height of the rotor is from 100% to 120% of the half-full angle divided by the number of blades in the rotor.

The rotor is shown in an exemplary embodiment, in which

Figure 1:
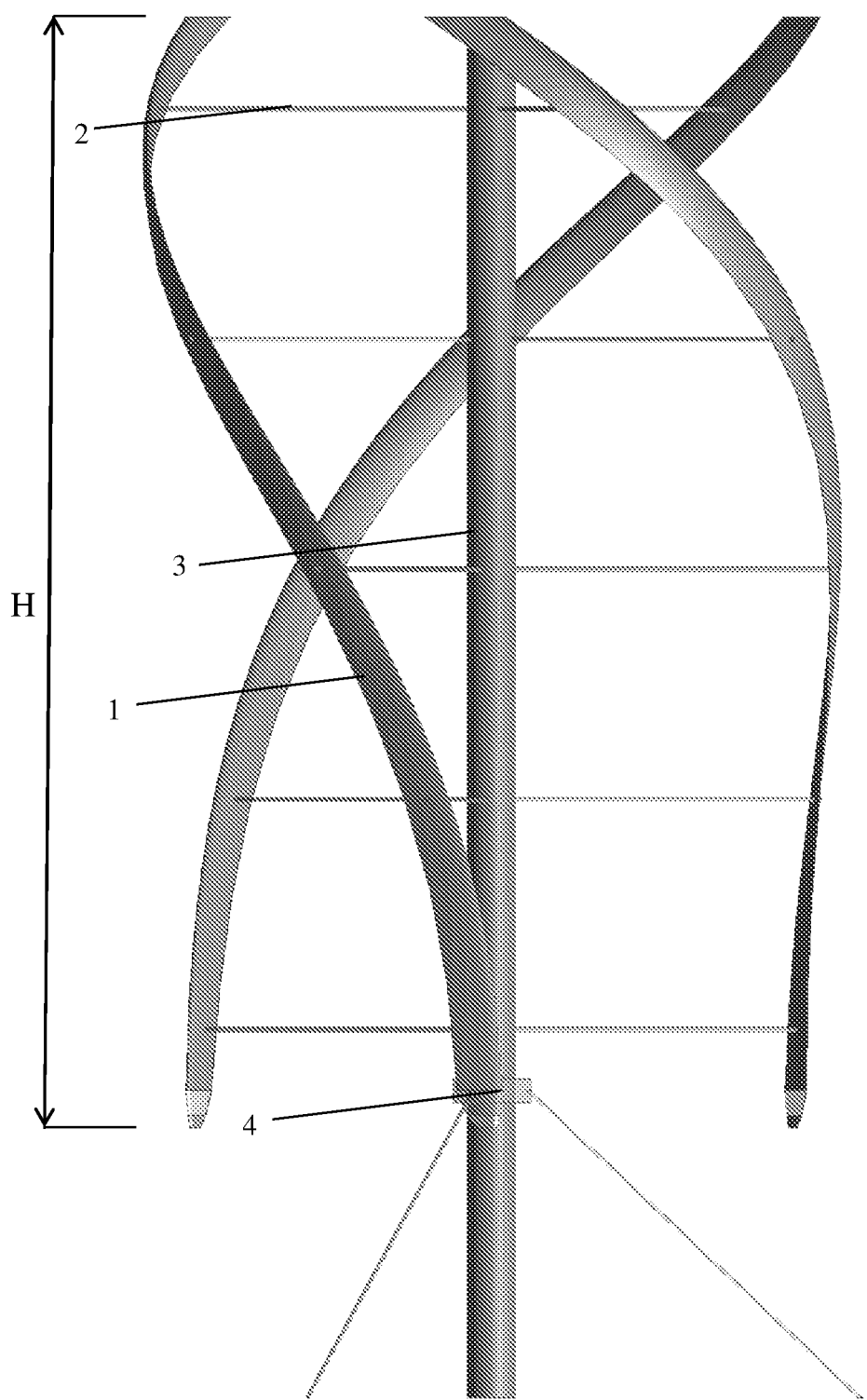
FIG. 1 is a front view of the rotor.
Figure 2:
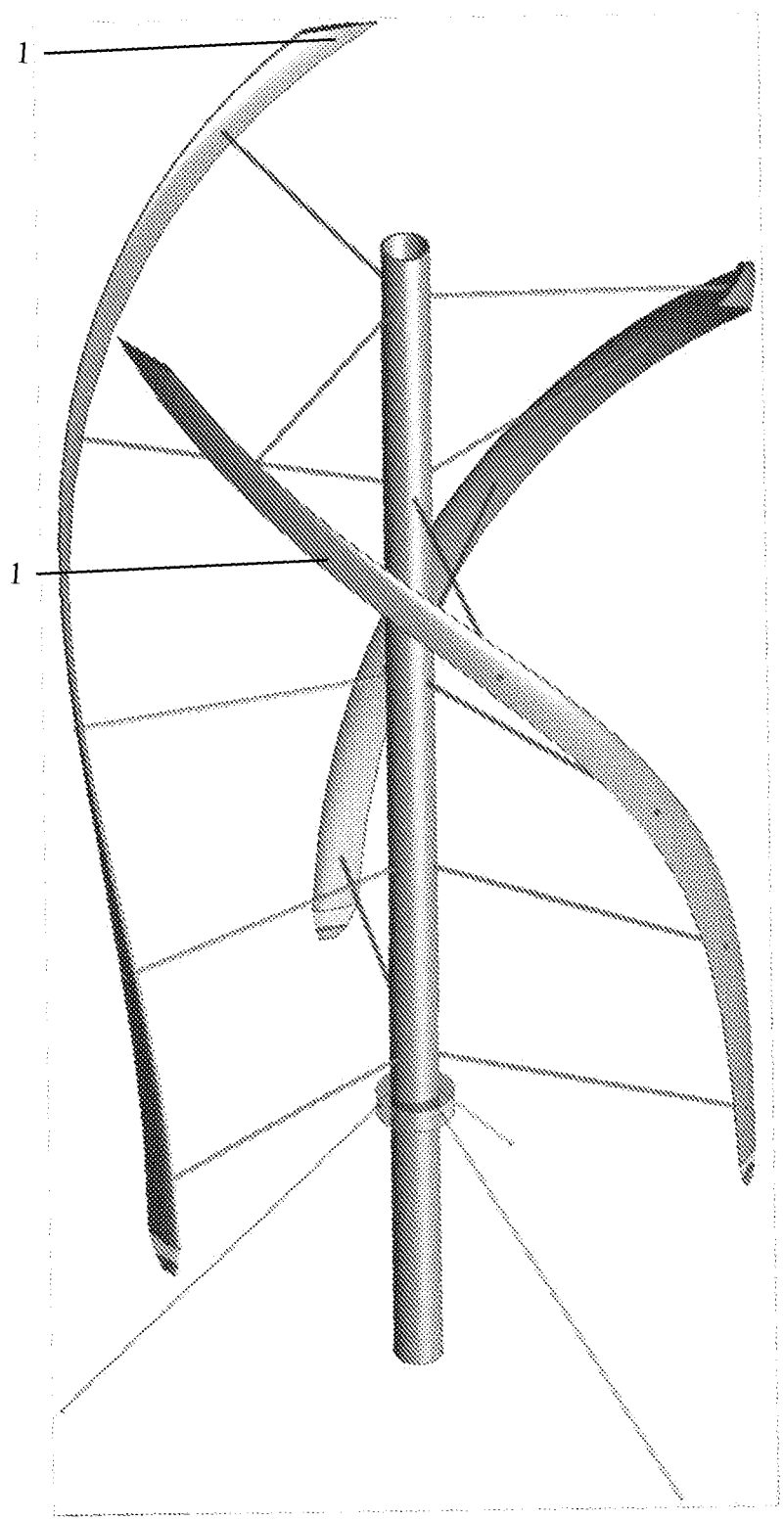
FIG. 2 is an isometric view of the rotor from FIG. 1.
Figure 3:
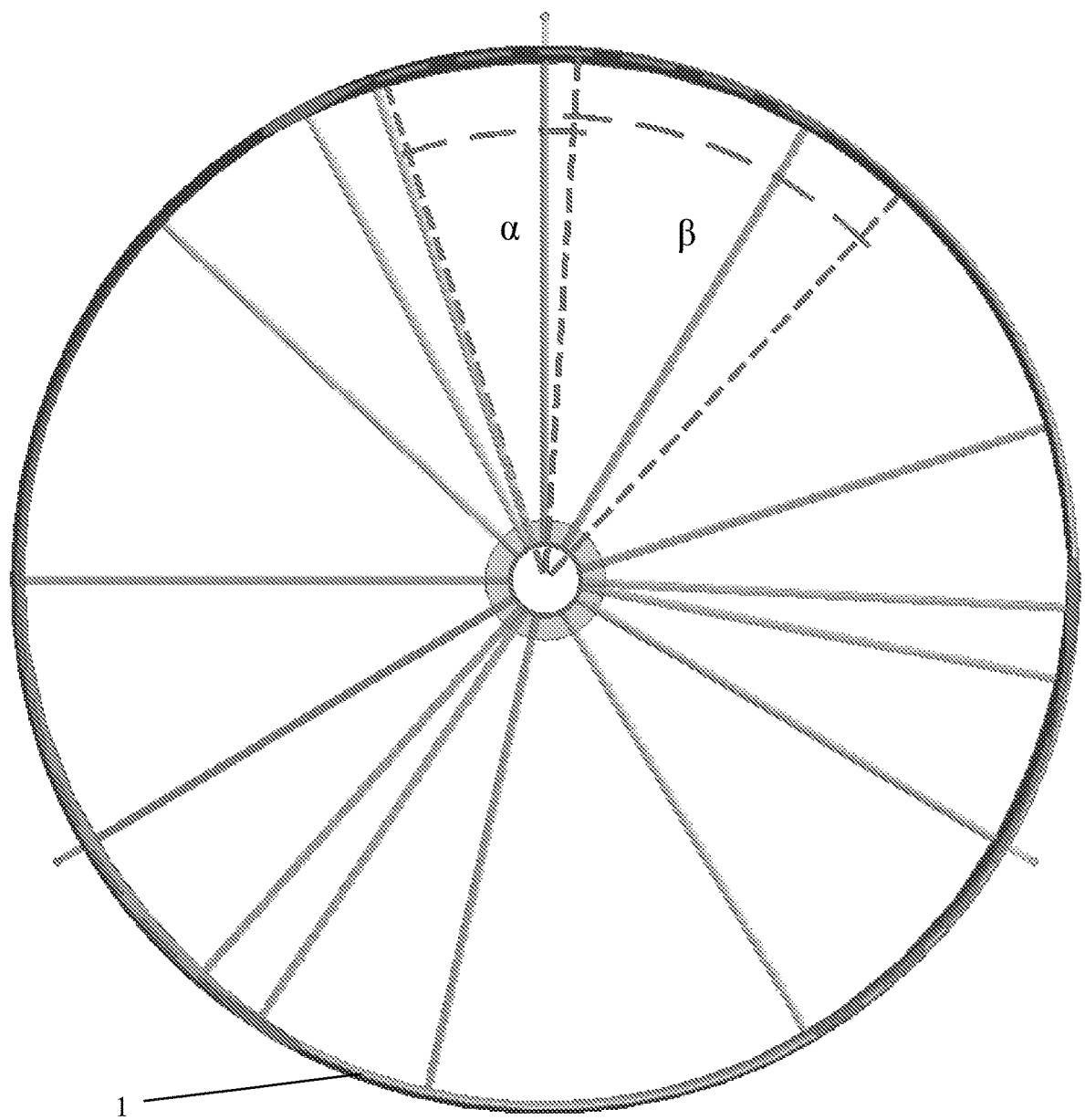
FIG. 3 is a top view of the rotor from FIG. 1.
Figure 4:
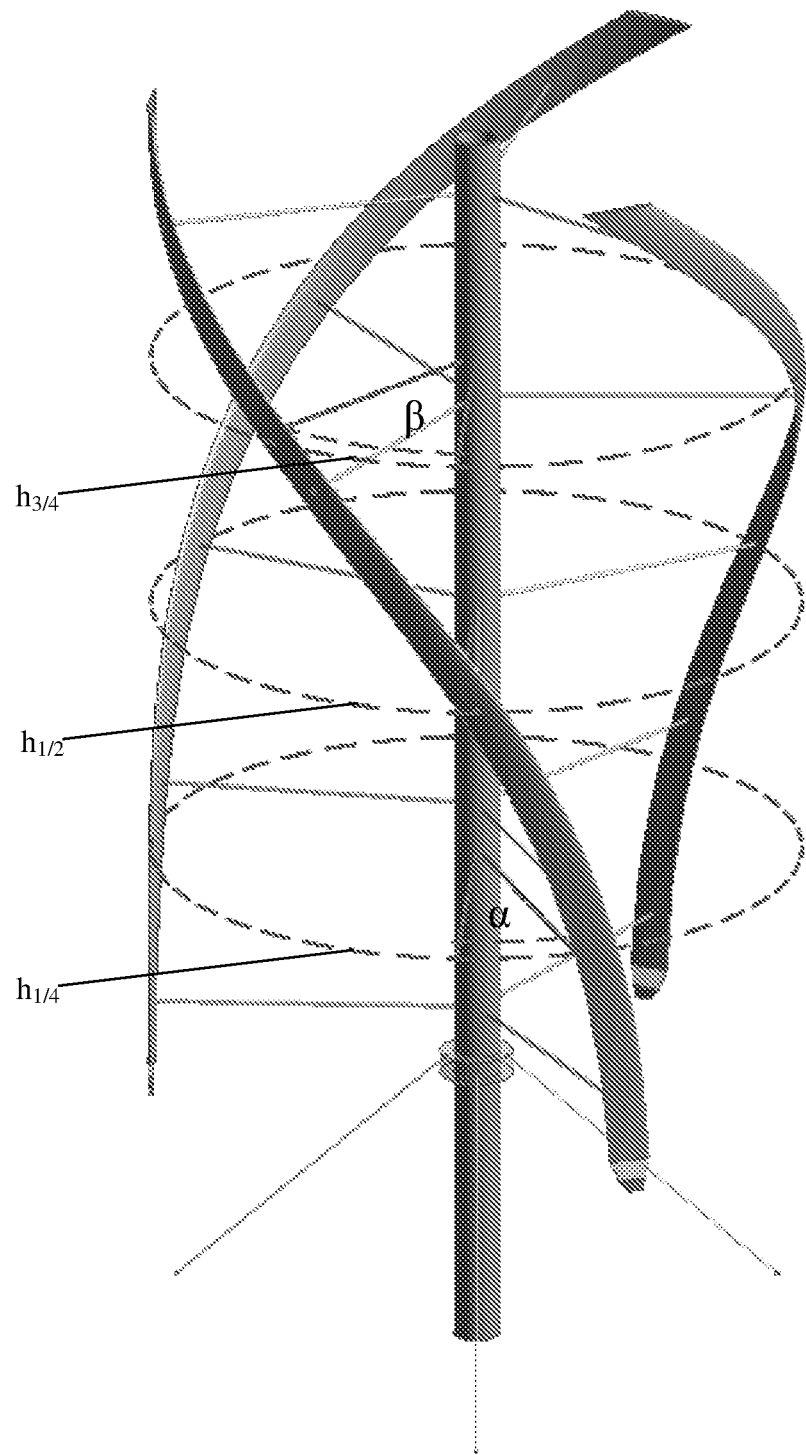
FIG. 4 is the rotor from FIG. 1 in a front view, inclined by 20 degrees.

As shown in FIG. 1, the rotor in the embodiment has three blades 1, attached with rigid connections 2 to the shaft 3. Attached to shaft 3 is a mount 4 in the form of a bearing, from which the stays extend. The blades are twisted along the length H of the rotor blades, measured as the length parallel to the shaft axis, in such a way that the level of the rotor twist intensity increases with height, and the angle $\alpha$, measured as an angle shift between the angular position in the rotation axis of the turbine of the trailing edge of the blades, at a height along the shaft $h_{1/4}$ corresponding to one quarter of the length parallel to the rotor shaft H of the blades from the side of mounting of the rotor shaft, and an angular position in the rotation axis of the turbine of the trailing edge of the blades, at a height along the shaft $h_{1/2}$ corresponding to half the length parallel to the shaft of the rotor H of the blades is twenty-one and four-tenths of a degree and angle $\beta$, measured as the angle shift between the angular position in the rotational axis of the turbine of the trailing edge of the blades, at a height along the shaft $h_{1/2}$ corresponding to half the length parallel to the rotor shaft H of the blades from the side of mounting the rotation shaft, and the angular position of the axis of rotation of the turbine trailing edge of the blades, at a height along the shaft $h_{3/4}$ corresponding to three-quarter of the length H parallel to the rotor shaft of the blades is thirty-nine degrees.

The operation of the object according to the invention allows for limiting the bending moments in the mounting of the rotor shaft, in a critical element of the structure, by distributing the bending moments more evenly than in Gorlov rotors or similar ones, that have a twist that is either even or symmetrical with relation to half the height of the rotor blades. For a larger number of blades, it may be advantageous to have the longitudinal twist angle of the blades in the rotation axis of the rotor along the entire height of the rotor from 100% to 120% of the full angle divided by the number of blades in the rotor, to ensure the most accurate representation of moments from all attack angles relative to the incoming wind. If fewer blades are used, the variant in which the longitudinal twist angle of the blades in the rotation axis of the rotor along the entire height of the rotor is not less than 90% of the half-full angle divided by the number of blades in the rotor may also be beneficial. This allows the construction of rotors with reduced twist, skewness and reduced material consumption than the above-mentioned variant, with the most equal representation of moments from half evenly spaced angles of attack relative to the incoming wind, more effective in reducing the amplitude of loads and maximum load values in the work cycle at the place of attachment of the rotor at the base than in a uniformly twisted rotor. The use of twists slightly larger than the angular distance between the symmetrically arranged blades allows for partial shortening of the lower sections of the blades with the smallest twist in the axis of rotation—e.g. in the rotor variant with three blades, spaced at 120 degrees, with a twist of 125 degrees, will shorten the section of the initial 5 degrees of the blade twist in the rotor axis of rotation, by representing its duplicate in terms of characteristics on the upper section of the rotor, where the levels of twist are greater in order to achieve more effective reduction of the bending moments at the shaft mounting.

The invention claimed is:

1. A flow turbine rotor comprising:
   a shaft (3); and
   rotor blades (1) with aerodynamic profiles defining leading and trailing edges,
   the rotor blades (1) coupled to the shaft (3) via a mount (4) and extend in twisted manner from the mount (4) in such a way that a twist of the rotor blades (1) around the shaft (3) varies with a height of the rotor blades (1);
   an angle α, measured as an angular deviation along a rotational direction of the shaft (3) between an angular position of a trailing edge of a respective rotor blade of the rotor blades (1), at a height $h_{1/4}$ along the shaft (3) located on ¼ of a length H of the shaft (3), measured parallel to the shaft (3) from the mount (4) of the shaft (3), and an angular position of the trailing edge of the respective rotor blade of the rotor blades 1, at a height $h_{1/2}$ along the shaft (3) located on ½ of the length H, measured parallel to the shaft (3) of the flow turbine rotor, is at least 20 percent smaller, than an angle β, measured as an angular deviation along the rotational direction of the shaft (3) between the angular position of the trailing edge of the respective rotor blade of the rotor blades (1), at the height $h_{1/2}$ corresponding to ½ of the length H measured parallel to the shaft (3) of the flow turbine rotor, and the angular position of the trailing edge of the respective rotor blade of the rotor blades (1), at a height $h_{3/4}$ along the shaft (3) located at ¾ of the length H of the shaft (3), measured parallel to the shaft 3 of the flow turbine rotor.

2. The flow turbine rotor according to claim 1, wherein a longitudinal twist angle of the rotor blades (1) in the rotational direction of the flow turbine rotor along an entire height h of the flow turbine rotor is not less than 90% of a full angle, representing 360 degrees, divided by the number of rotor blades (1) in the flow turbine rotor.

3. The flow turbine rotor according to claim 2, wherein the longitudinal twist angle of the blades (1) in the rotational direction of the flow turbine rotor along the entire height of the flow turbine rotor is not less than 90% of a half-full angle, representing 360 degrees divided by 2, divided by the number of rotor blades (1) in the flow turbine rotor.

4. The flow turbine rotor according to claim 3, wherein the longitudinal twist angle of the rotor blades in the rotational direction along the entire rotor height is from 100% to 120% of the half-full angle divided by the number of rotor blades (1) in the flow turbine rotor.

5. The flow turbine rotor according to claim 2, wherein the longitudinal twist angle of the rotor blades (1) in the rotational direction along the entire rotor height is from 100% to 120% of the full angle divided by the number of rotor blades (1) in the flow turbine rotor.

6. The flow turbine rotor according to claim 1, wherein the angular position of the trailing edge of the rotor blades (1), at the height $h_{1/2}$ along the shaft (3) located on ½ of the length H, measured parallel to the shaft (3) of the flow turbine rotor, is at least 30 percent smaller than the angle β.

7. The flow turbine rotor according to claim 1, wherein a longitudinal twist angle of the rotor blades (1) in the rotational direction of the flow turbine rotor along an entire height h of the flow turbine rotor is not less than 100% of a full angle, representing 360 degrees, divided by the number of rotor blades (1) in the flow turbine rotor.

* * * * *